United States Patent [19]

Shiraishi et al.

[11] 4,419,698

[45] Dec. 6, 1983

[54] COLOR VIDEO SIGNAL RECORDING AND/OR REPRODUCING SYSTEM

[75] Inventors: Yuma Shiraishi, Kamakura; Yoshihiko Oota, Yokohama, both of Japan

[73] Assignee: Victor Company of Japan, Ltd., Yokohama, Japan

[21] Appl. No.: 245,983

[22] Filed: Mar. 20, 1981

[30] Foreign Application Priority Data

Mar. 21, 1980 [JP] Japan .................................. 55-35851

[51] Int. Cl.³ .......................................... H04N 5/782
[52] U.S. Cl. .................................... 358/330; 358/328
[58] Field of Search .................... 358/4, 8, 327, 328, 358/330

[56] References Cited

U.S. PATENT DOCUMENTS

| 4,007,482 | 2/1977 | Amari | 358/328 |
| 4,007,484 | 2/1977 | Amari | 358/328 X |
| 4,084,176 | 4/1978 | Trost | 358/8 |
| 4,177,481 | 12/1979 | Yamagiwa et al. | 358/8 |
| 4,208,673 | 6/1980 | Numakura | 358/328 X |
| 4,220,964 | 9/1980 | Yamagiwa et al. | 358/8 |
| 4,233,621 | 11/1980 | Yamagiwa et al. | 358/8 |
| 4,245,234 | 1/1981 | Melwisch | 358/8 |

FOREIGN PATENT DOCUMENTS 2042434 3/1972 Fed. Rep. of Germany .
2849180 5/1979 Fed. Rep. of Germany .

Primary Examiner—Bernard Konick
Assistant Examiner—Donald McElheny, Jr.
Attorney, Agent, or Firm—Louis Bernat

[57] ABSTRACT

A color video signal recording or reproducing system has a recording system which separates a luminance signal (including a horizontal synchronizing signal) and a carrier chrominance signal, from a color video signal. These separated signals are frequency-converted and modulated to be mixed, multiplexed, and recorded on mutually adjacent parallel tracks. The recorded positions of the horizontal synchronizing signals are not aligned in the mutually adjacent tracks on the recording medium. A predetermined delay is given to the carrier chrominance signal for every recording track, so that the positions of the frequency-converted carrier chrominance signal, corresponding to a horizontal synchronizing interval, are aligned in the mutually adjacent tracks. The reproducing system delays the reproduced frequency-converted carrier chrominance signal so that the sum of the delays which occur during recording and reproduction is constant, regardless of the track being reproduced.

6 Claims, 13 Drawing Figures

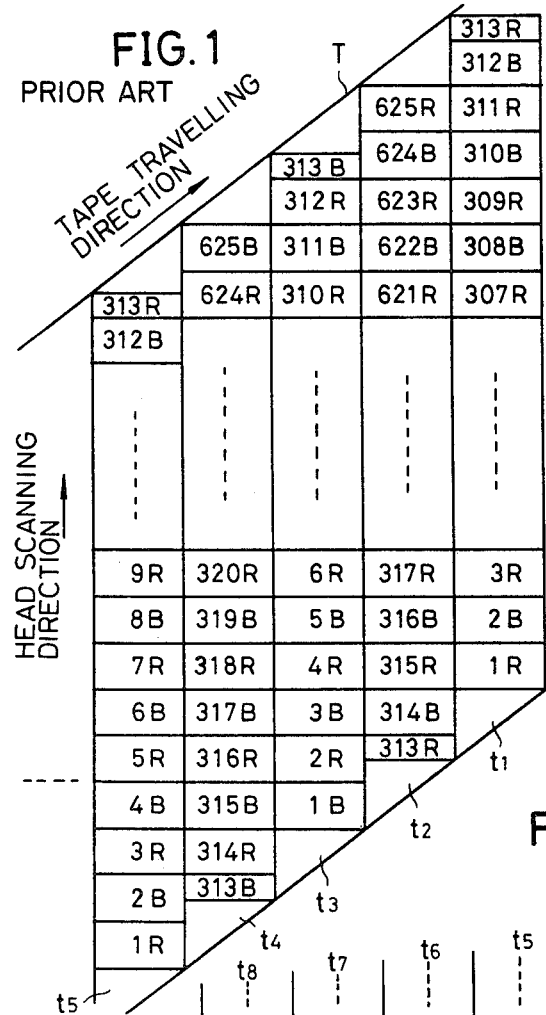
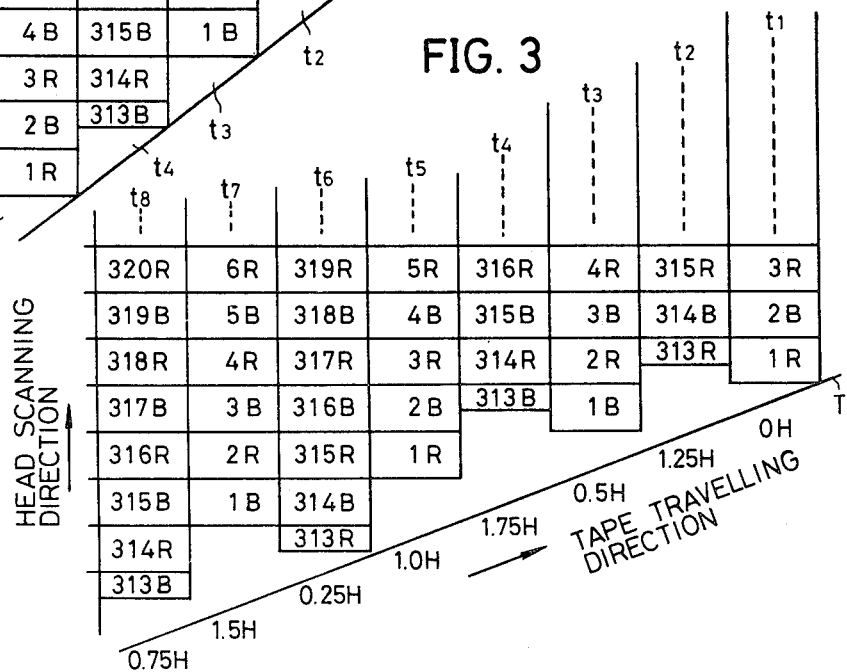

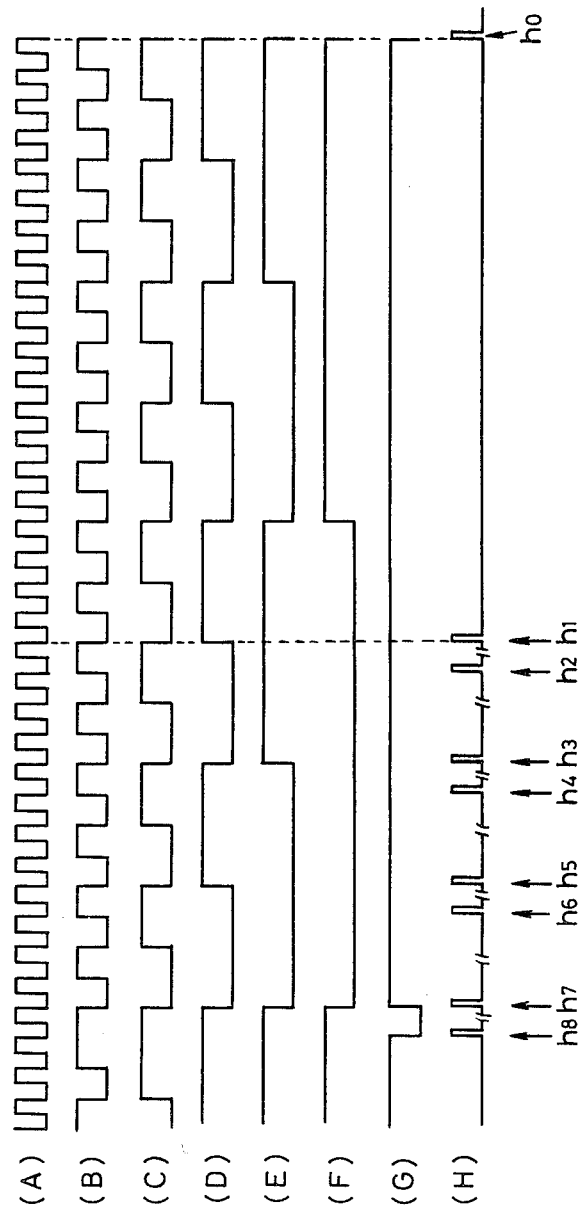

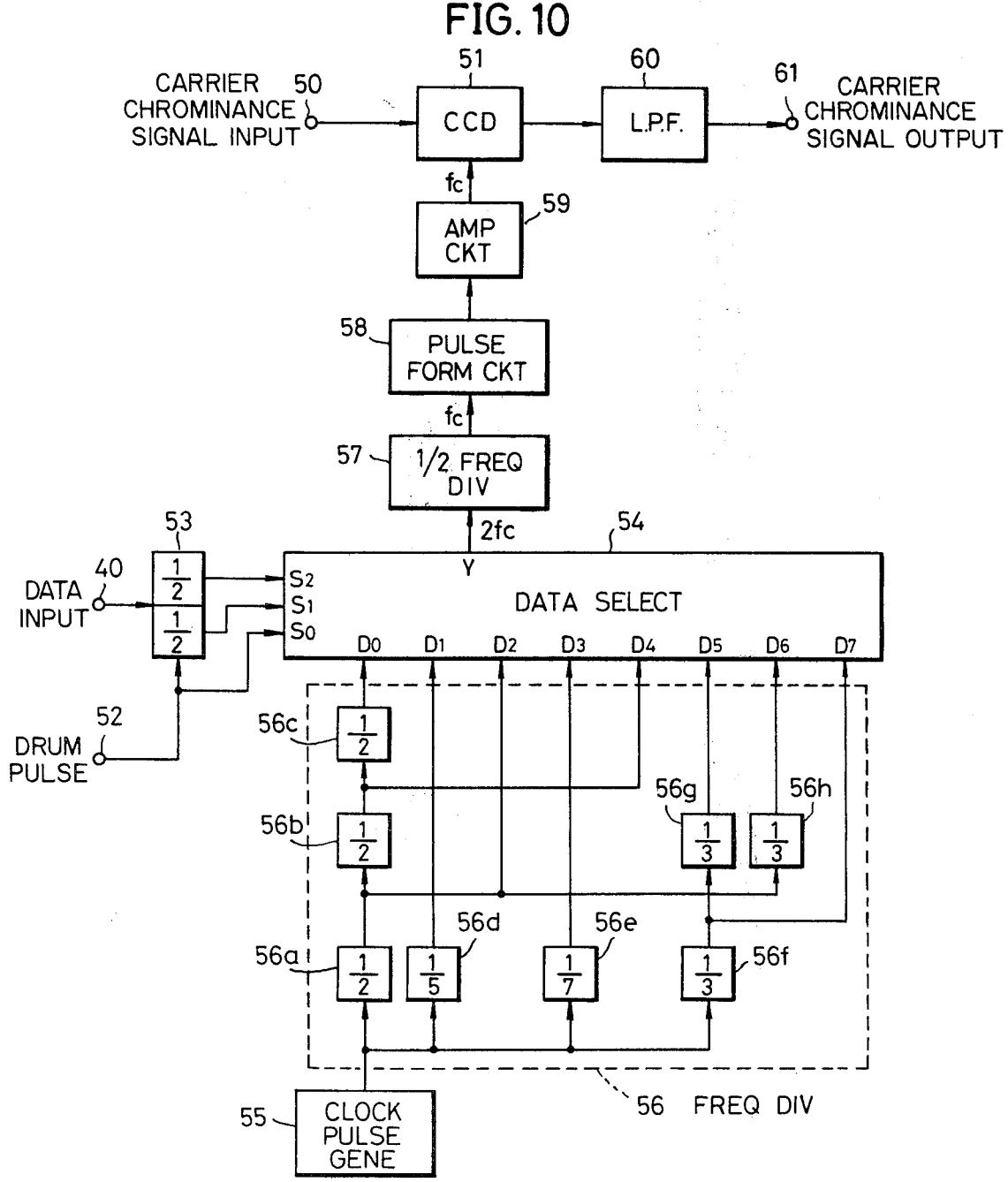

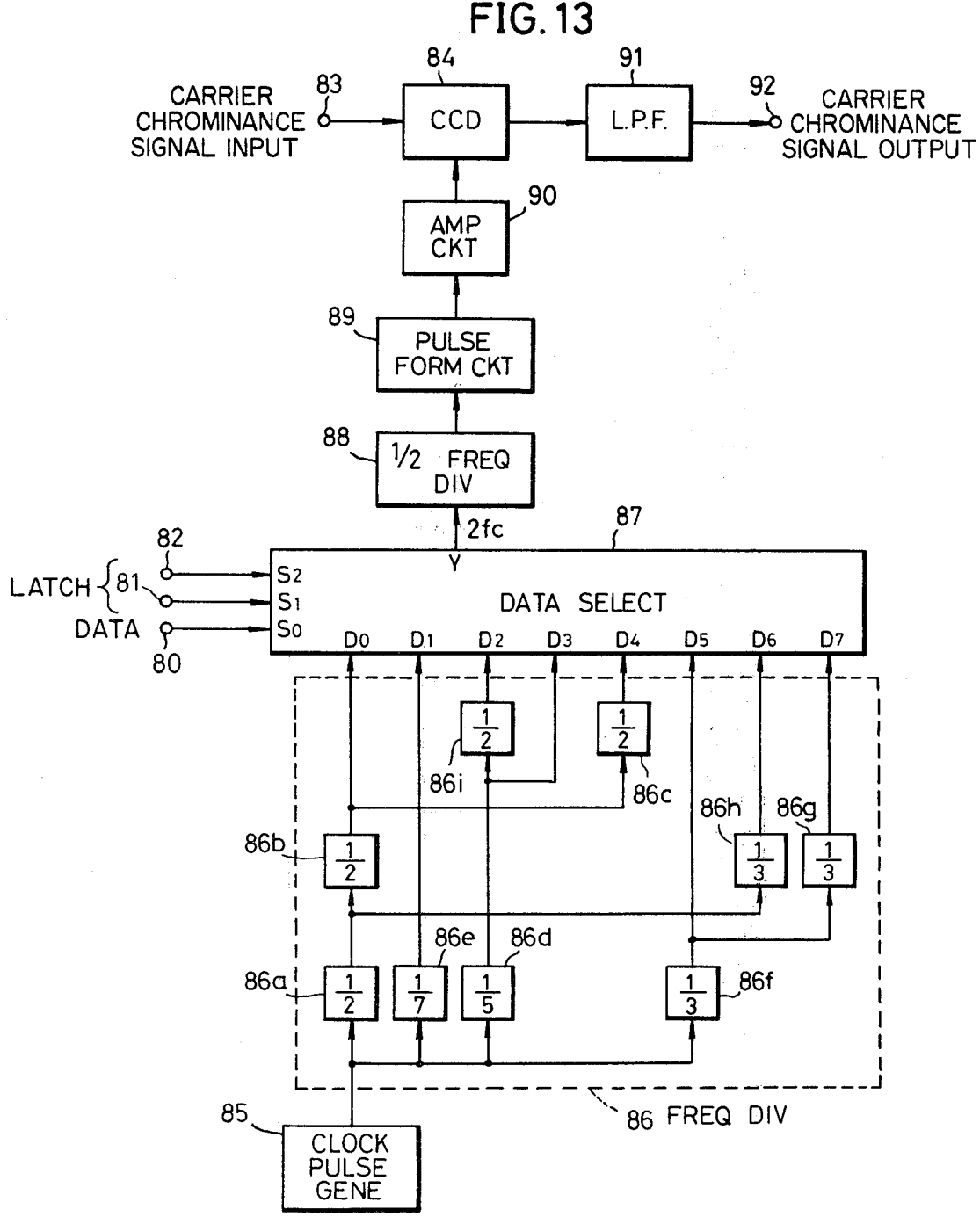

COLOR VIDEO SIGNAL RECORDING AND/OR REPRODUCING SYSTEM

BACKGROUND OF THE INVENTION

The present invention generally relates to color video signal recording and/or reproducing systems, and more particularly to a color video signal recording and/or reproducing system which does not introduce degradation in the reproduced picture even in a recording system in which the horizontal synchronizing signal recorded positions are substantially not formed in alignment in a direction perpendicular to the longitudinal direction of a linear recording track, or in a radial direction of a spiral or concentric recording track, and especially suitable when applied to a magnetic recording and/or reproducing apparatus, a video disc, and the like.

Generally, in the recording system of a SECAM system color video signal recording and/or reproducing apparatus, for example, a SECAM system color video signal is supplied to a low-pass filter and a band-pass filter, and a luminance signal is separated and filtered by the low-pass filter while a carrier chrominance signal is separated and filtered by the band-pass filter. The above carrier chrominance signal is a signal in which a first frequency modulated signal obtained by frequency modulating a first color sub-carrier frequency by a color difference signal B-Y, and a second frequency modulated signal obtained by frequency modulating a second color sub-carrier frequency by a color difference signal R-Y, are formed into a signal every one horizontal scanning period (1H), in an alternate, time-series, and composite manner. The above carrier chrominance signal having a carrier frequency of 3.9 MHz to 4.75 MHz, for example, is supplied to a frequency dividing circuit wherein the carrier chrominance signal is frequency-divided and converted into a frequency in a lower frequency range. Moreover, the carrier frequency of the carrier chrominance signal is set to within a range between 0.97 MHz to 1.19 MHz, for example, and the frequency deviation width is reduced. The carrier chrominance signal converted into the lower frequency range thus obtained, and the chrominance signal which has undergone frequency conversion, are separately multiplexed and amplified into a composite color video signal, and then supplied to a pair of magnetic heads having mutually different azimuth angles.

On the other hand, in the reproducing system, the above pair of magnetic heads alternately reproduce the composite color video signal recorded on the magnetic recording medium (magnetic tape). The outputs of the pair of magnetic heads are respectively amplified, and are formed into a continuous signal by being alternately changed over a switching circuit. The frequency modulated luminance signal in the above continuous signal obtained, is separated and filtered by a high-pass filter, and then demodulated and converted into a luminance signal by a demodulating circuit. The carrier chrominance signal in the low frequency band in the above continuous signal, is separated and filtered by a low-pass filter, and then supplied to a band-pass filter to be returned into a predetermined frequency band, after being returned to the original carrier frequency by a multiplying circuit. These reproduced carrier chrominance signal and the reproduced luminance signal supplied from the above demodulating circuit, are formed into a reproduced SECAM system color video signal by a composite circuit, in a composite manner.

In the above described recording and/or reproducing apparatus, one tape pattern fromed on the magnetic tape, for example, is one in which mutually adjacent tracks are formed without guard bands, by use of a pair of magnetic heads having mutually different azimuth angles. In this type of a tape pattern, for example, the horizontal synchronizing signal recording positions are arranged and aligned in a direction perpendicular to the longitudinal direction of the track. The alignment of the horizontal synchronizing signal is referred to as an H-alignment. Furthermore, the frequency modulated signal component of the carrier chrominance signal recorded after being converted into a lower frequency region, is the same at a certain recorded interval where the carrier chrominance signal is recorded, and at the position on an adjacent track from the above certain recorded interval, where the color difference signal R-Y is frequency modulated. Accordingly, very little cross-talk is introduced between adjacent tracks due to the carrier chrominance signal in the lower frequency range, and the demodulated color video signal is hardly affected by the above cross-talk.

However, a case will now be considered in which only the tape travelling speed is reduced to one-half that upon normal operation without varying the diameter of the drum, the tape width, the rotational speed of the drum, and the number of horizontal scanning lines of the reproducing apparatus, to perform a long-duration recording or reproduction in the magnetic recording and/or reproducing apparatus which forms the above described tape patterns, that is, to perform four hours of recording or reproduction, for example, by use of a magnetic tape for performing a two-hour recording or reproduction. In the tape pattern obtained in this case, the horizontal synchronizing signal recorded positions are not aligned in the adjacent tracks, that is, the horizontal synchronizing signal recording positions are not in an H-alignment. Accordingly, no correlation exist between the adjacent tracks, and the carrier frequency of the carrier chrominance signal in the low frequency range differ in the adjacent tracks. Moreover, since the adjacent tracks are recorded by use of the pair of magnetic heads having mutually different azimuth angles, the azimuth loss in the frequency modulated luminance signal in the high frequency range becomes large, and little cross-talk is introduced between the adjacent tracks. However, since the recorded carrier chrominance signal is in the low frequency range, the azimuth loss becomes small, and furthermore, because the carrier frequencies of the carrier chrominance signals aligned and recorded in the adjacent tracks differ, the demodulated color signal is greatly affected by the cross-talk introduced from the adjacent tracks. Moreover, beat interferences are also introduced.

SUMMARY OF THE INVENTION

Accordingly, a general object of the present invention is to provide a novel and useful color video signal recording and/or reproducing system in which the above described problems have been overcome.

Another and more specific object of the present invention is to provide a color video signal recording and/or reproducing system in which the carrier chrominance signal is recorded so that the horizontal synchronizing intervals of the carrier chrominance signal in the adjacent tracks are aligned, and the luminance signal is recorded so that the horizontal synchronizing intervals of the luminance signal in the adjacent tracks are not aligned, by delaying only the carrier chrominance signal which is affected by cross-talk upon recording, and the delay time of the delayed carrier chrominance signal is set so that the delay time becomes constant regardless of the track upon reproduction, to reduce the undesirable effect introduced by the cross-talk from the adjacent tracks.

Other objects and further features of the present invention will be apparent from the following detailed description when read in conjunction with the accompanying drawings.

BRIEF DESCRIPTION OF THE DRAWINGS

FIG. 1 is a diagram showing a tape pattern which indicates the recorded positions of a SECAM system color video signal upon normal recording or reproduction;

FIGS. 3 and 4 are diagrams respectively showing embodiments of a tape pattern which indicates the recorded positions of a carrier chrominance signal in a SECAM system color video signal recorded in an H-alignment according to the system of the present invention;

FIGS. 8 (A) through 8 (G) and FIGS. 9 (A) through 9 (H) are graphs respectively showing signal waveforms for explaining the operation of the system shown in FIG. 7;

FIG. 10 is a systematic circuit diagram showing one example of the essential part of the circuit system shown in FIG. 5;

FIG. 13 is a systematic circuit diagram showing one example of another essential part of the reproducing system shown in FIG. 6.

DETAILED DESCRIPTION

The tape pattern on a magnetic tape T which is recorded and/or reproduced by a normal recording and/or reproducing system, is formed where the adjacent tracks are recorded by a pair of magnetic heads having mutually different azimuth angles without forming guard bands as shown in FIG. 1, wherein a first track t1 comprises intervals 1R, 2B, 3R, - - - , 312B and 313R, a second track t2 comprises intervals 313R, 314B, - - - , 624B and 625R, and so on. In the above tracks, the interval 1R represents an interval wherein are recorded the carrier chrominance signal obtained by frequency modulating a carrier by the color difference signal R-Y of the first 1H (H represents one horizontal scanning period), the interval 2B represents an interval wherein are recorded the carrier chrominance signal obtained by frequency modulating a carrier by the color difference signal B-Y of a following 1H, the interval 3R represents an interval wherein are recorded the color chrominance signal obtained by frequency modulating a carrier by the color difference signal R-Y of a third 1H, and so on. In the intervals designated in the above described manner, the number indicates the order of the horizontal scanning line in one frame, and the symbols R and B respectively indicate that the frequency modulated signal component of the color chrominance signal respectively are color difference signals R-Y and B-Y (the frequency is set to one-fourth the regular carrier frequency).

In the tape pattern shown in FIG. 1, the horizontal signal recorded positions are aligned in the H-alignment state. For example, the interval 315R is positioned in the adjacent track t2, adjacent to where the interval 1R is positioned in the track t1, and the interval 4R is positioned in the adjacent track t3, adjacent to where the interval 315R is positioned in the track t2. Hence, in these intervals, the frequency modulated signal components of the color chrominance signals which are converted into a low frequency range and recorded, are the same. Accordingly, little cross-talk is introduced between adjacent tracks, of the color chrominance signals in the low frequency range. A correlation generally exists between the signal components having one field intervals of the color video signal which are to be recorded, and for example, the difference in the frequencies between the interval 1R and the interval 315R is small. Therefore, hardly any cross-talk is introduced between the intervals designated by the same symbols in the adjacent tracks, that is, between the intervals designated the by symbol R, and the intervals designated by the symbol B. Moreover, hardly any effects are introduced with respect to the demodulated color signal.

Figure 2:
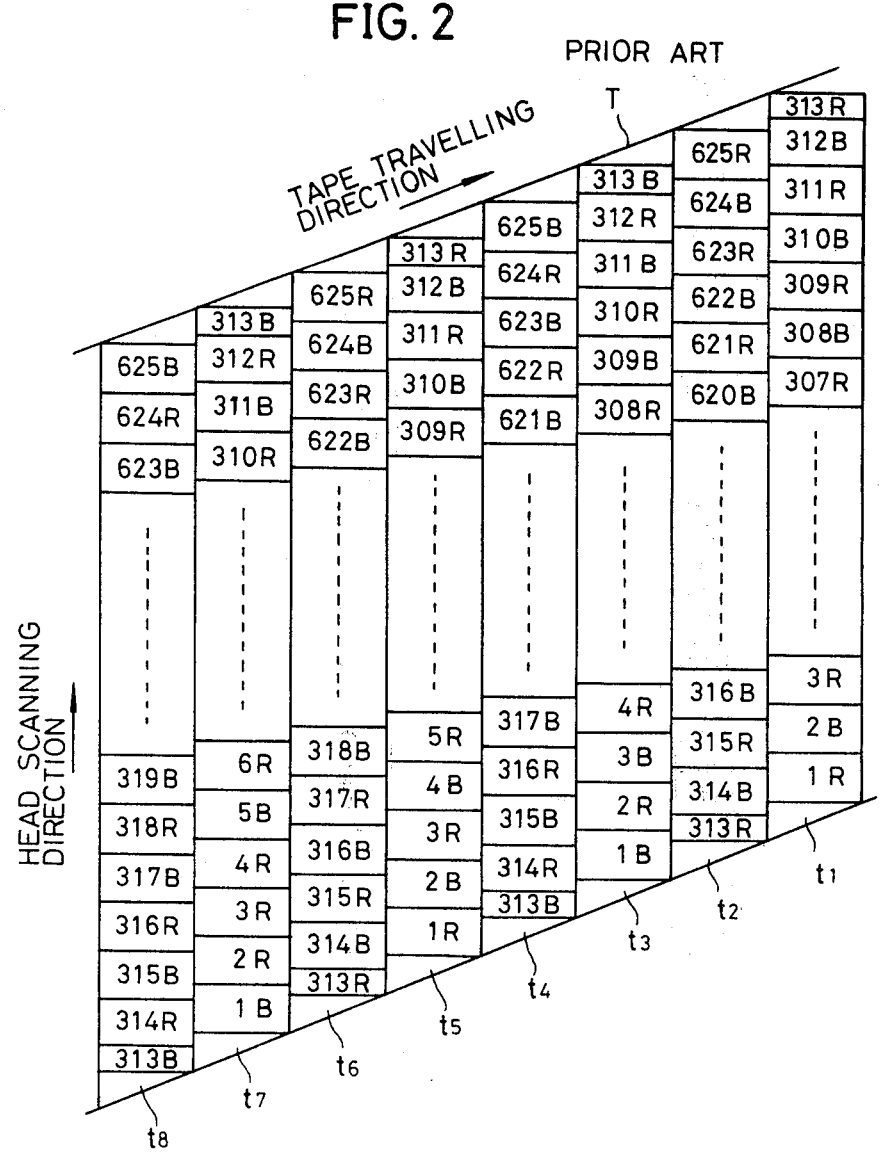
FIG. 2 is a diagram showing a tape pattern which indicates the recorded positions of a SECAM system color video signal when the tape travelling speed is reduced to one-half that upon normal recording or reproduction.

When only the tape speed is reduced to one-half that upon normal recording or reproduction mode without varying the diameter of the drum, the tape width, the rotational speed of the drum, and the number of the horizontal scanning line in a magnetic recording and/or reproduction apparatus which forms the tape pattern shown in FIG. 1 in order to extend the recording and reproduction time, that is, to perform four hours of recording or reproduction by use of a tape for performing two hours of recording or reproduction, for example, the tape pattern becomes as shown in FIG. 2. In the tape pattern shown in FIG. 2, the horizontal synchronizing signal recorded positions are not aligned in adjacent tracks, and therefore, no correlation exists between the adjacent tracks. Accordingly, the carrier frequencies of the carrier chrominance signals in the low frequency range differ in the adjacent tracks. In this case, since the adjacent recording tracks are recorded by magnetic heads having mutually different azimuth angles, the azimuth loss of the frequency modulated luminance signals in the high frequency range become large, and little effects are introduced due to cross-talk from the adjacent tracks. However, since the recorded carrier chrominance signals are in the low frequency range, the azimuth loss becomes small. Moreover, because the carrier frequencies of the carrier chrominance signals aligned and recorded in the adjacent tracks differ, beat interferences are introduced due to the crosstalk from the adjacent tracks.

The present invention has eliminated the above described problems. First, a case will be described where shift of 0.75H is introduced in the tape pattern of a magnetic tape reproduced, when only the tape travelling speed is decreased to one-half that upon normal recording and reproduction. In this case the carrier chrominance signals can be recorded so that the carrier chrominance signals having the same frequency modulated signal components are adjacent to each other in the adjacent tracks, by applying a variation of delay quantities having eight tracks as one period to the carrier chrominance signals. That is, at a certain track, the carrier chrominance signal is delayed by a delay quantity of zero and not delayed, and at the following tracks, the carrier chrominance signals are respectively delayed by delay quantities of 1.25H, 0.5H, 1.75H, 1.0H, 0.25H, 1.5H, and 0.75H, as shown in FIG. 3. In FIG. 3, these tracks are respectively referred to as tracks t1, t2, - - -, t8.

Upon reproduction, the time-relationships between the carrier chrominance signals must be returned to the original relationships. Accordingly, the reproduced carrier chrominance signal from the track t1 is delayed by a delay quantity of 2H, and the reproduced carrier chrominance signal from the following track t2 is delayed by a delay quantity of 0.75H. Semilarly, the reproduced carrier chrominance signals from the following tracks t3, t4, - - -, t8 are respectively delayed by delay quantities of 1.5H, 0.25H, 1.0H, 1.75H, 0.5H and 1.25H. Hence, the sum of the delay quantities in the same track upon recording and reproduction all become 2H.

However, when reproducing tracks of the tape pattern shown in FIG. 3, a switch is required to be provided to determine which tracks are to be delayed or not delayed, since the carrier chrominance signal recorded in the track t1 is not delayed upon recording. Furthermore, when a charge transferring element such as a charge coupled device (CCD) is used to perform the above delay, the clock pulse frequency must be set quite high upon obtaining the delay quantity of 0.25H. On the other hand, it is difficult to obtain all the above eight delay quantities in the recording and reproducing systems when a CCD having an especially small number of steps is used. Accordingly, in any case, it is difficult to obtain the above delay quantity of 0.25H.

Figure 4:
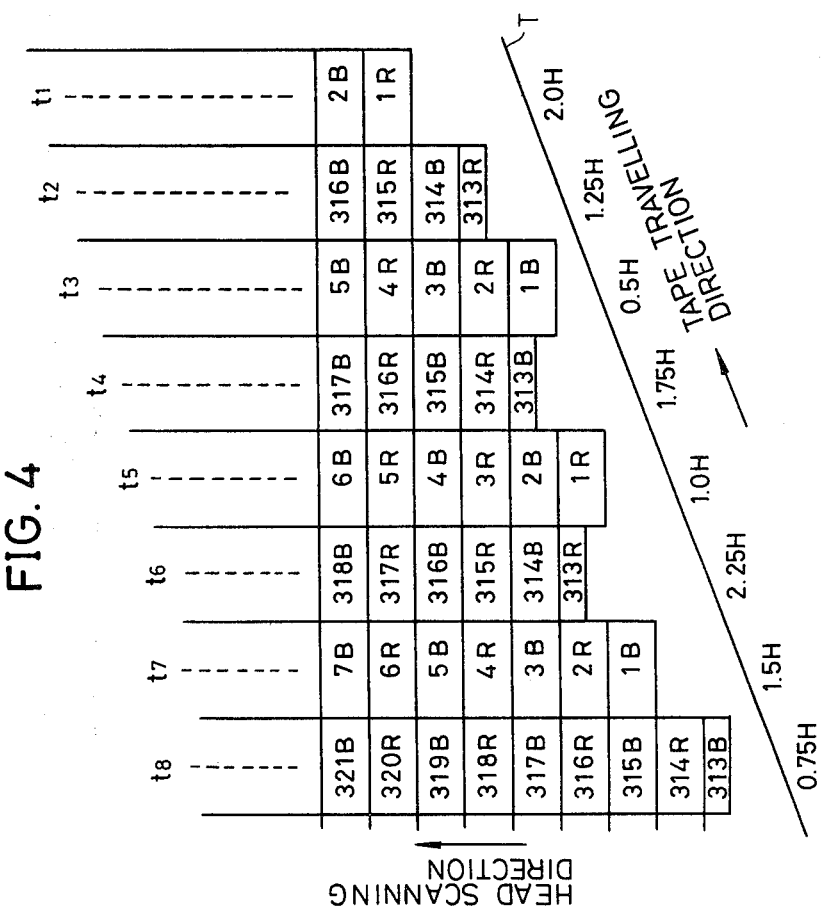

Hence, in the present embodiment of the present invention, a tape pattern shown in FIG. 4 is recorded and formed, and reproduced.

In the present embodiment, the delay quantities applied to the carrier chrominance signals which are to be recorded in the tracks t1 through t8, are 2.0H in the track t1, 1.25H in the track t2, and similarly, 0.5H, 1.75H, 1.0H, 2.25H, 1.5H, and 0.75H, respectively, in the following tracks, as shown in FIG. 4. This delay pattern is repeated every eight track (scanning time) period. In order to reproduce a magnetic tape having the above described tape pattern, a delay quantity of 1H is applied in the track t1, and similarly, delay quantities of 1.75H, 2.5H, 1.25H, 2.0H, 0.75H, 1.5H, and 2.25H are respectively applied in the following tracks, of the carrier chrominance signals reproduced from the tracks t1 through t8. That is, the delay quantities upon reproduction are set so that the sum of the delay quantities upon recording and reproduction is 3H in all the tracks. By setting the delay quantities as described above, the carrier chrominance signal is always delayed in the recording and reproducing systems. Accordingly, there is no need for a switch to determine whether the carrier chrominance signal is to be delayed or not, and moreover, all the necessary delay quantities can be obtained.

Upon reproduction in the present embodiment of the invention, a discriminating signal which indicates the delay quantity upon recording, is multiplexed and recorded with the frequency modulated luminance signal and the carrier chrominance signal which has been converted into a low frequency range and delayed, in order to determine the delay quantity upon reproduction so that the sum of the delay quantities upon recording and reproduction becomes a predetermined delay quantity (the sum of the delay quantities is 3H in the case shown in FIG. 4) in all the tracks. Hence, the delay quantity upon reproduction is determined by detecting the discriminating signal. In the present embodiment of the invention, the discriminating signal is recorded throughout the entire length of the track, so that the system is compatible upon variable speed reproduction. However, in cases where a variable speed reproduction is not performed or the circuit devices and the like are simplified, the discriminating signal for discriminating a plurality of delay times can be a single discriminating signal and recorded every scanning period of a predetermined track.

Next, an embodiment of a recording system according to the recording and/or reproducing system of the present invention will be described in conjunction with FIG. 5. An incoming SECAM system color video signal is supplied to a low-pass filter 11 and a band-pass filter 12 through an input terminal 10, and a luminance signal is separated and filtered at the low-pass filter while a carrier chrominance signal is separated and filtered at the band-pass filter. The above luminance signal is supplied to a frequency modulator 14 through an automatic gain control (AGC) circuit 13, and converted into a frequency modulated luminance signal having a predetermined frequency band. Further, this frequency modulated luminance signal is supplied to a recording amplifier 16 through a high-pass filter 15 wherein the unwanted components of the signal are eliminated.

On the other hand, the above carrier chrominance signal having a carrier frequency between 3.9 MHz and 4.75 MHz, is supplied to a ¼ frequency divider 17. As is well known, the carrier chrominance signal is a signal wherein a first frequency modulated signal obtained by frequency modulating a first color sub-carrier frequency by the color difference signal B-Y, and a second frequency modulated signal obtained by frequency modulating a second color sub-carrier frequency by the color difference signal R-Y, are alternately formed into a signal every one horizontal scanning period (1H) in a time-series and composite manner. The carrier chrominance signal thus supplied to the ¼ frequency divider 17 is a frequency-divided into one-fourth the frequency, and converted into a low frequency range. In addition, the carrier frequency of the carrier chrominance signal is set within a range between 0.97 MHz and 1.19 MHz, that is, the frequency deviation is reduced to one-fourth that of the original.

Figure 5:
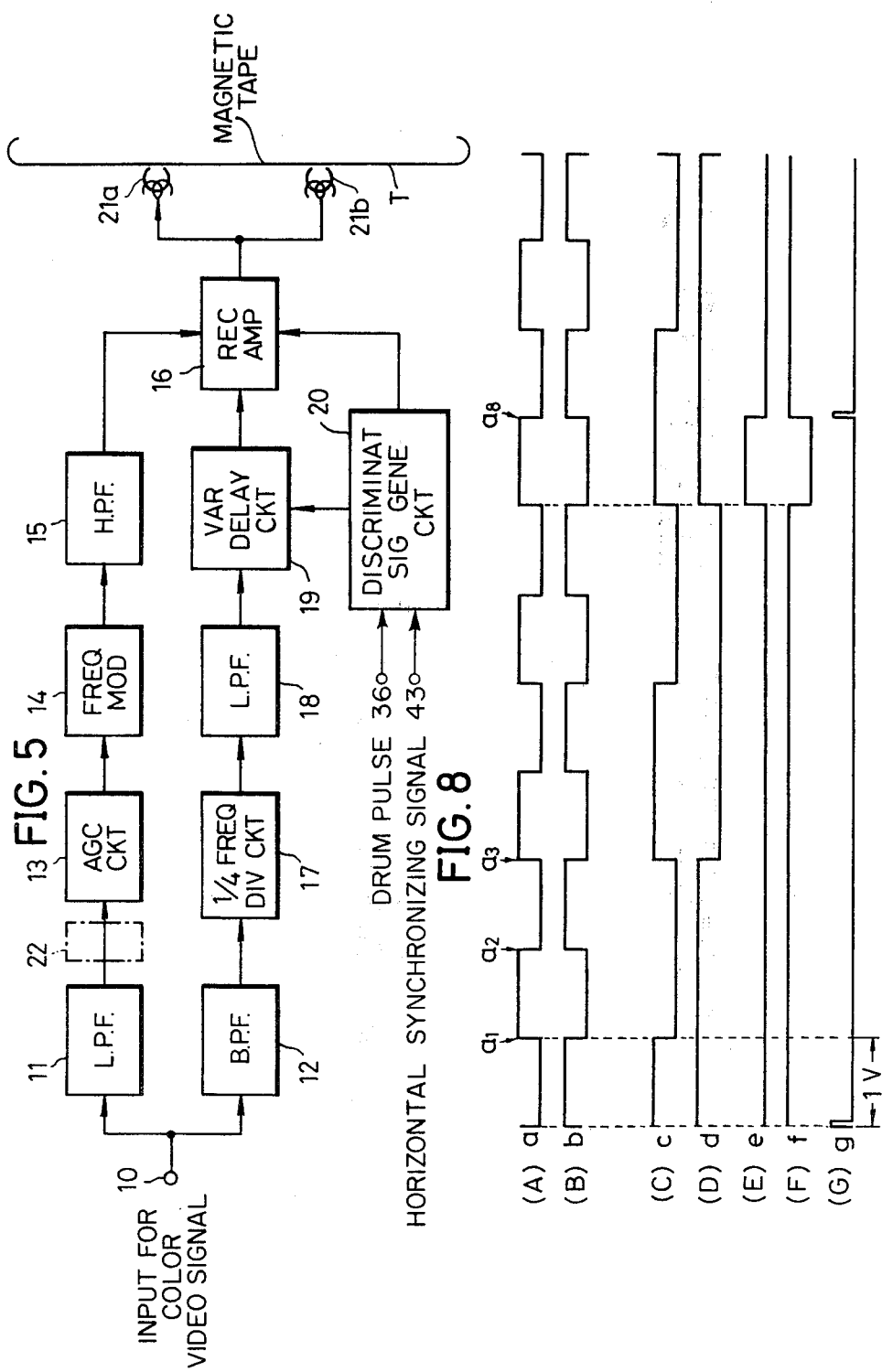
FIG. 5 is a systematic block diagram showing an embodiment of a recording system according to the system of the present invention.

In FIG. 5, a discriminating signal generator 20 is constructed as will be described hereinafter in conjunction with FIG. 7, and produces an output pulse every eight tracks at predetermined falling edges of drum pulses. The discriminating signal generator 20 forms the track t1 as shown in FIG. 4 during one track scanning time from the point in time where the above output pulse is generated, and also supplies a discriminating signal for discriminating the delay quantity to the recording amplifier 16. A variable delay circuit 19 is a variable delay circuit which successively applies predetermined delay quantities to the carrier chrominance signal obtained from a low-pass filter 18, by the drum pulses and the pulse obtained during the scanning time period of eight tracks supplied from the discriminating signal generator 20, and is constructed as shown in FIG. 10, for example, which will be described hereinafter.

The composite color video signal, in which the frequency modulated luminance signal obtained from the recording amplifier 16, the carrier chrominance signal which is converted into a low frequency range, and the discriminating signal, are respectively frequency divided and multiplexed, is recorded onto the magnetic tape T by a pair of magnetic heads 21a and 21b. In this case, a tape pattern is obtained in which the frequency modulated luminance signals are not in an H-alignment, and only the carrier chrominance signals are in an H-alignment as shown in FIG. 4. The recording waveform of the above discriminating signal is a sinusoidal waveform, and the discriminating signal frequencies are set so that the frequencies are $2n \times (f_H/2)$ and $(2n-1)(f_H/2)$ in the adjacent tracks, where n is an integer and $f_H$ is the horizontal scanning frequency. In the present embodiment of the invention, the discriminating signal frequencies are selected in the order of $10f_H$, $10.5f_H$, $12f_H$, $12.5f_H$, $14f_H$, $14.5f_H$, and $16.5f_H$, as will be described hereinafter. That is, the frequencies of the discriminating signals are selected at a frequency band slightly separated from the carrier chrominance signal which is converted into a low frequency range, by considering the fact that the frequency deviation of the frequency modulated luminace signal is between 3.4 MHz and 4.4 MHz, and the frequency deviation of the carrier chrominance signal which is converted into a low frequency range (the carrier chrominance signal is a frequency modulated signal) is between 0.97 MHz and 1.19 MHz.

Accordingly, in a two-head helical scan type magnetic recording and/or reproducing apparatus of a system such as the azimuth recording and/or reproducing system of the present embodiment of the invention, the discriminating signal is in a low frequency range upon reproduction when recording is performed in a state where the tracks are recorded side by side without providing guard bands between the tracks. Therefore, the azimuth loss becomes small, and the cross-talk from the adjacent tracks becomes large.

Figure 6:
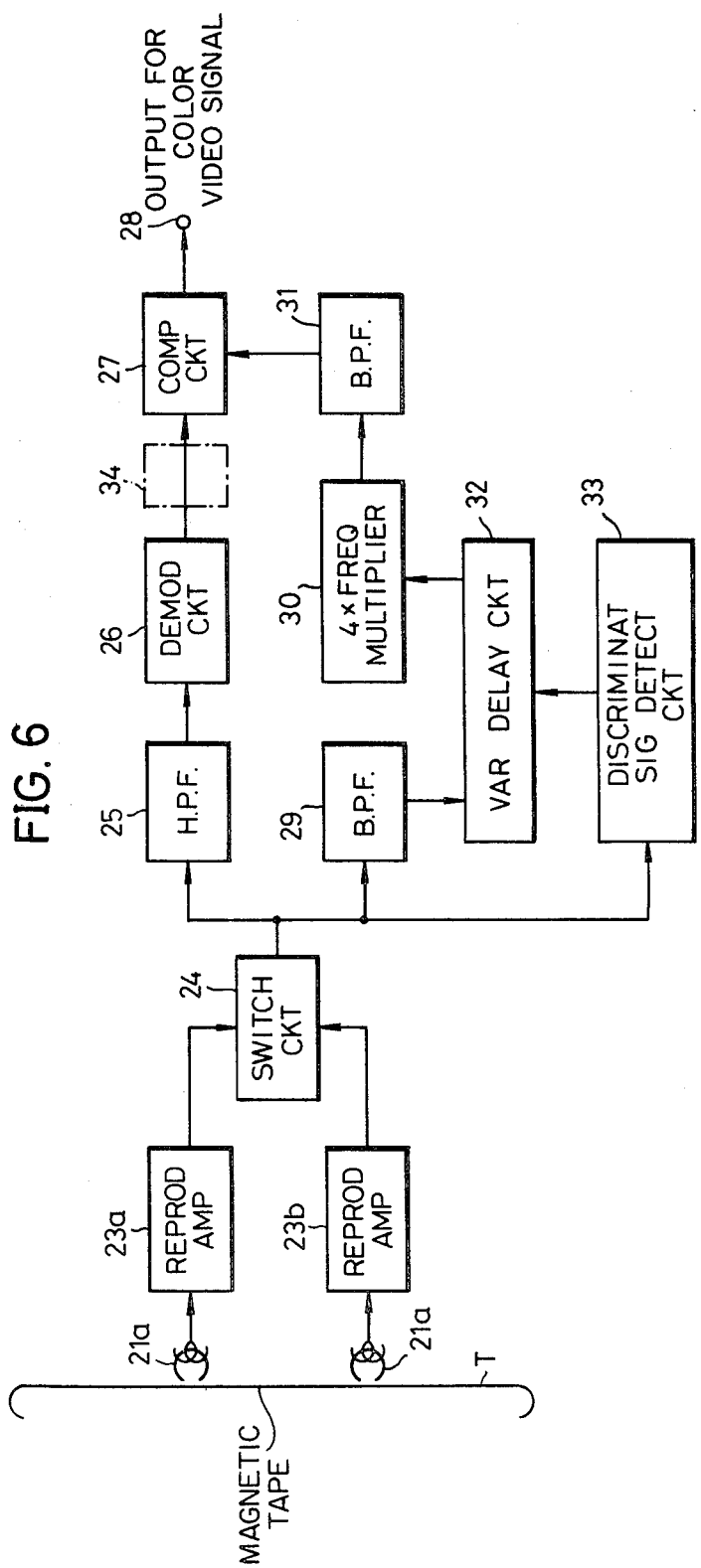
FIG. 6 is a block diagram showing an embodiment of a reproducing system according to the system of the present invention.

In a reproducing system shown in FIG. 6, the composite color video signal recorded on the magnetic tape T is alternately reproduced by the pair of magnetic heads 21a and 21b. The outputs of the magnetic heads 21a and 21b are respectively amplified at reproducing amplifiers 23a and 23b, and are alternately changed over and converted into a continuous signal by a switching circuit 24. The above continuous signal is supplied to a high-pass filter 25 and a band-pass filter 29. The frequency modulated luminance signal in the reproduced composite color video signal is separated and filtered by the high-pass filter 25, and then demodulated into a luminance signal by a demodulating circuit 26.

Upon reproduction of the discriminating signal by a discriminating signal detecting circuit 33 of the reproducing system shown in FIG. 6, the delay time of the carrier chrominance signal which is being reproduced, is discriminated from the discriminating signal wherein the cross-talk component has been eliminated, by use of a comb filter which will be described hereinafter. Furthermore, upon reproduction, a delay quantity which makes the sum of the delay quantities upon recording and reproduction constant, is applied to the reproduced carrier chrominance signal in the low frequency range obtained from the band-pass filter 29, by a variable delay circuit 32. The reproduced carrier chrominance signal thus delayed at the variable delay circuit 32 is supplied to a four times multiplier 30. The delay time added at the variable delay circuit 32 is successively changed over every one horizontal scanning period into a predetermined delay quantity, according to the output discriminating signal of the discriminating signal detecting circuit 33. Thus, the reproduced carrier chrominance signals obtained from the variable delay circuit 32 are respectively delayed by a constant time as a result.

Next, further description will be given with respect to the essential part of the recording system in the present embodiment of the invention. FIG. 7 is a systematic circuit diagram showing one example of the discriminating signal generator 20. In FIG. 7, an incoming drum pulse a supplied to an input terminal 36, is applied to an input terminal CK of a presettable counting down circuit 37 wherein a subtraction operation is performed. The periods in which the above drum pulse a is of a positive polarity correspond to the periods in which one of the magnetic heads 21a and 21b is scanning the track, and the periods in which the above drum pulse a is of a negative polarity correspond to the periods in which the other magnetic head is scanning the track. Data "1", "1", "0", and "1" ("1011" in binary code) are constantly applied to preset data input terminals A, B, C, and D of the presettable counting down circuit 37, and these preset input data are loaded at the rising edge of the output of a three-input AND gate 38, and supplied from output terminals $Q_A$, $Q_B$, $Q_C$, and $Q_D$. The three input terminals of the three-input AND gate 38 are respectively connected to the output terminals $Q_B$ and $Q_C$ of the circuit 37, and the drum pulse input terminal 36 through an inverter 39. Hence, when the drum pulse a is of low level, and respective outputs d and e of the output terminals $Q_B$ and $Q_C$ respectively become of high levels as shown respectively in FIGS. 8(D) and 8(E), the AND gate 38 produces an output signal of high level. Accordingly, the outputs from the output terminals $Q_A$ through $Q_D$ of the circuit 37 become the output data, and the output of the AND gate 38 immediately becomes of low level since the output e from the output terminal $Q_C$ becomes of low level. Therefore, the output of this AND gate 38 becomes a positive polarity pulse g shown in FIG. 8(G) in which the pulse width is quite narrow. This pulse g is supplied to a load terminal LD of the above circuit 37 and also supplied to the variable delay circuit 19 which will be described hereinafter in conjunction with FIG. 10 through an output terminal 40.

The circuit 37 holds the input preset data "1011" until the next clock pulse, that is, until the drum pulse a is supplied to the circuit 37. Thus, the outputs of the output terminals $Q_A$, $Q_B$, $Q_C$, and $Q_D$ are respectively held at a high level, high level, low level, and high level, as shown by respective signals c, d, e, and f in FIGS. 8(C), 8(D), 8(E), and 8(F). In the present embodiment of the invention, the circuit 37 is constructed to perform subtracting operations at the rising edges of the clock pulses.

Each of the output terminals $Q_A$ through $Q_D$ of the circuit 37 are respectively connected to input terminals C, D, E, and F which are respectively at the third, fourth, fifth, and sixth bits of a presettable counting up circuit 41. Moreover, input terminals A and B respectively at the first and second bits of the circuit 41, are respectively connected to the drum pulse input terminal 36. Data "0", "0", "1", "1", "0", and "1" ("101100" in binary code) are respectively and continuously applied to the preset data input terminals A, B, C, D, E, and F of the circuit 41 when the above output pulse g is supplied, during the period in which the drum pulse a is of positive polarity (one track scanning period, that is, one field period, for example). The circuit 41 is a six-bit binary counter, and is supplied with an output signal of a voltage controlled oscillator (VCO) 46 to a clock pulse input terminal CK, to perform addition operations.

The output signal frequency of the VCO 46 is approximately between $20f_H$ and $33f_H$, and is of a waveform shown in FIG. 9(A). When the counted value in the circuit 41 becomes of a predetermined value by performing an adding operation on the output signal of the VCO 46, the circuit 41 supplies a low-level pulse to a monostable multivibrator 42 and triggers this multivibrator 42. Due to this triggering of the multivibrator 42, a pulse having a narrow pulse width is applied to a phase comparator 45 by the multivibrator 42. This narrow pulse is also applied to a load terminal LD of the circuit 31, to load the input data at that point in time ("101100" in binary code) into the circuit 41. The output of the multivibrator 42 at this point in time becomes as shown by a pulse h1 in FIG. 9(H), and the circuit 41 counts the clock pulses from the VCO 46 twenty times. However, when the outputs at each bits of the circuit 41 becomes of low level, an output shown by at a position h0 in FIG. 9(H) is obtained from the multivibrator 42, and thus, the circuit 41 is returned to the original input data loading state. The above operations are repeated. Accordingly, the circuit 41 effectively frequency-divides the output of the VCO 46 into one-twelfth that of the original.

On the other hand, a horizontal synchronizing signal in the SECAM system color video signal which is to be recorded, is supplied to an input terminal 43 and triggers a monostable multivibrator 44. The output pulse of one horizontal scanning period of the multivibrator 44, undergoes phase-comparison with the pulse which is frequency-divided into one-twelfth that of the original by the multivibrator 42, in the phase comparator 45. The oscillating frequency of the VCO 46 is controlled by a voltage respective of the phase difference obtained above, supplied from the phase comparator 45. Accordingly, the phase comparator 45 including a low-pass filter, the VCO 46, the circuit 41, and the monostable multivibrator 42 construct a so-called phase locked loop (PLL), and the VCO 46 is oscillated so that the two inputs of the phase comparator 45 become equal, that is, the output frequencies of the monostable multivibrators 42 and 44 become equal. Hence, the oscillating frequency of the VCO 46 becomes $20f_H$ when the frequency dividing ratio of the circuit 41 is one-twelfth, since the input signal of the multivibrator 44 is a horizontal synchronizing signal.

When the drum pulse a shown in FIG. 8(A) rises as shown at a point a1, the circuit 37 counts down by one, and the result becomes "1010" in binary code. That is, only the output of the output terminal $Q_A$ shown in FIG. 8(C) becomes of low level, of the outputs of the output terminals $Q_A$ through $Q_D$ in the circuit 37 respectively shown in FIGS. 8(C) through 8(F). An output pulse b of the inverter 39 is shown in FIG. 8(B). Therefore, the input data of the circuit 41 becomes "101011" in binary code, and this input data is also reduced by one in the binary code. In this case, the circuit 41 starts the adding operation of the output signal of the VCO 46 from the point where the input data ("101011" in binary code) is supplied thereto, that is from the position indicated by h2 in FIG. 9(H), and performs the adding operation until a point where the outputs of the bits in the circuit 41 shown in FIGS. 9(B) through 9(G) all become of low levels as shown at the position h0 in FIG. 9(H). Moreover, the outputs of all the bits in the circuit 41 is returned to the same states as those of the input data by the output of the multivibrator 42 at the position h0, that is, the outputs of the bits are returned to the state at the position h2. Similar operations are repeated thereafter. Thus, the frequency dividing ratio of the circuit 41 becomes 1/21, and the oscillating frequency of the VCO 46 becomes $21f_H$.

Next, the drum pulse a rises as shown in FIG. 8(A) at a point a2, however, as described above, the output of the circuit 37 does not change at the falling edge of the clock pulse. On the other hand, since the drum pulse a becomes of low level, the input terminals A and B of the circuit 41 respectively become "0". Accordingly, the input data supplied to the circuit 41 becomes "101000" in the binary code, and the input data value is decreased by three from the previous input data, mainly, "101011". Hence, the above circuit 41 starts the counting operation of the output signal of the VCO 46 from a position shown by h3 in FIG. 9(H) to the position shown by h0. The circuit 41 again starts the counting operation of the output signal of the VCO 46 from the position shown by h3 due to the output of the multivibrator 42 to the position shown by h0. The above counting operation is repeated in the one track scanning period until the drum pulse a next rises at a point a3 shown in FIG. 8(A). Therefore, the output signal of the VCO 46 is frequency divided into 1/24 that of the original by the circuit 41, and the output oscillating frequency of the VCO 46 becomes $24f_H$.

The above counter 41 repeats the counting operation of the output signal of the VCO 46 in the intervals h4 through h0, h5 through h0, h6 through h0, h7 through h0, and h8 through h0 respectively shown in FIG. 9(H), every half period of the drum pulse a, that is, every one track scanning period of the two magnetic heads, and frequency divides the output signal of the VCO 46 by 1/25, 1/28, 1/29, 1/32, and 1/33, in that order. Accordingly, the output oscillating frequency of the VCO 46 is varied every one track scanning period by $25f_H$, $28f_H$, $29f_H$, $32f_H$, and $33f_H$, in that order. In addition, FIG. 9(G) shows the waveform of the output signal supplied to the multivibrator 42 from the circuit 41 when the output oscillating frequency of the VCO 46 is $33f_H$.

The output signal frequencies of the above circuit 41 and the multivibrator 42 are always equal to the horizontal scanning frequency $f_H$ regardless of the drum plate a. In FIGS. 9(A) through 9(H), the output signal waveforms of the VCO 46, the circuit 41, and the multivibrator 42 are identical, and these waveforms were shown in the same figure to simplify the figure, however, it should be noted that the time-axis differ upon every scanning of the track. That is, upon scanning (recording) of the first track t1, the output signal waveform of the multivibrator 42 is shown at positions h1 and h0 where the interval between these positions is equal to one horizontal scanning period. Similarly, the output signal waveforms of the multivibrator 42 upon recording of the tracks t2, t3, - - - , t8 are respectively shown at positions h2 and h0, h3 and h0, - - - , h8 and h0, where the time intervals between the two positions are all equal to one horizontal scanning period. When the output oscillating frequency of the VCO 46 is 33$f_H$, the output of the circuit 37 in the binary code is "0111", and thus, the output d of the output terminal $Q_B$ and the output e of the output terminal $Q_C$ of the three inputs applied to the AND gate 38 respectively are of high levels ("1"), however, the remaining output b of the inverter 39 is of low level ("0").

In the above described state, the drum plate a next falls at a position a8 as shown in FIG. 8(A), but since the output b of the inverter 39 becomes of high level at this falling edge of the drum pulse a, the three inputs of the AND gate 38 all become of high level. Furthermore, the output g of the AND gate 38 becomes of high level as shown in FIG. 8(G), and loads a preset input data ("1011" in binary code) into the circuit 37. Accordingly, only the output e of the output terminal $Q_C$ of the three inputs of the AND gate 38 becomes of low level as shown in FIG. 8(E), and hence, the output g of the AND gate 38 immediately becomes of low level as shown in FIG. 8(G).

Due to the above loading of the preset input data into the circuit 37, the output oscillating frequency of the VCO 46 becomes 20$f_H$ as described above. From then on, operations similar to the above are repeated. The output signal of the VCO 46 is counted by the circuit 41 on one hand, and frequency divided into one-half that of the original at an one-half frequency divider 47 on the other. The frequency divided output signal of the VCO 46 is converted into a rectangular wave having a duty cycle of 50%, and is passed through a low-pass filter 48 which converts the rectangular wave into a sinusoidal wave, to produce a discriminating signal as output from an output terminal 49. The frequencies of the discriminating signal obtained from the output terminal 49 becomes 10$f_H$, 10.5$f_H$, 12$f_H$, 12.5$f_H$, 14$f_H$, 14.5$f_H$, 16$f_H$, and 16.5$f_H$, in that order, and this is repeated every one track scanning period. The discriminating signal having the above frequencies are applied to the recording amplifier 16 shown in FIG. 5.

Next, detailed description will be given on the operation of one example of the variable delay circuit 19 shown in FIG. 5, by referring to the systematic block diagram in FIG. 10. In FIG. 10, the incoming carrier chrominance signal in the low frequency range which is to be recorded, is applied to a charge coupled device (CCD) 51 through an input terminal 50. As will be described hereinafter, the same delay time is added to a certain track as a track positioned at a corresponding position in another frame, by the above CCD 51. The delay quantity $\tau$ of the CCD 51 can be described by the following equation.

$$\tau = N \times (1/f_c) = N/f_c$$

In the above equation, the frequency $f_c$ indicates the clock pulse frequency of the CCD 51, and N (N is an integer) indicates the number of steps in the CCD 51. Accordingly, in order to obtain the delay quantities of 0.5H, 0.75H, 1.0H, 1.25H, 1.5H, 1.75H, 2.0H, and 2.25H so that the tape pattern shown in FIG. 4 can be obtained, a total of eight kinds of clock frequencies $f_c$ must be formed, mainly, $Nf_H/0.5$, $Nf_H/0.75$, $Nf_H/1.0$, $Nf_H/1.25$, $Nf_H/1.5$, $Nf_H/1.75$, $Nf_H/2.0$, and $Nf_H/2.25$, which can be obtained from the above equation. The duty cycle of the clock pulse is set to 50%, and the frequency is frequency-divided into one-half by an one-half frequency divider 57. Thus, the output frequency of a data selector 54 must be 2$f_c$. Furthermore, in order to form eight kinds of clock pulses from a single clock pulse generator 55, the oscillating frequency of the clock pulse generator 55 is selected to 8$Nf_H$, and a frequency divider 56 is constructed from frequency dividers 46a through 46h which respectively perform frequency division of ½, ¼, ⅓, 1/5, 1/7, ⅛, ⅜, and ⅜. Accordingly, frequency signals of $Nf_H$, $(8/5)Nf_H$, $4Nf_H$, $(8/7)Nf_H$, $2Nf_H$, $(8/9)Nf_H$, $(4/3)Nf_H$, and $(8/3)Nf_H$ are respectively applied to data input terminals D0, D1, D2, D3, D4, D5, D6, and D7 of the data selector 54, from the frequency divider 56.

On the other hand, a drum pulse supplied from an input terminal 52 is applied to a selecting terminal S0 of the three selecting terminals S0, S1, and S2 of the data selector 54. Moreover, a pulse obtained by frequency-dividing the drum pulse into one-half that of the original is supplied to the terminal S1 from a frequency divider 53. A pulse obtained by frequency-dividing the above frequency-divided pulse into one-half that of the original, that is, a resulting pulse obtained by frequency-dividing the above drum pulse into one-fourth that of the original, is applied to the terminal S2 from a frequency divider 53. The frequency divider 53 is constructed from two cascaded one-half frequency dividers, and is reset by the pulse g supplied from the discriminating signal generator 20 shown in FIG. 7, through the output terminal 40.

The data selector 54 supplies a predetermined input data, of the input data supplied to the data input terminals D0 through D7, from an output terminal Y, according to the input applied to the above terminals S0, S1, and S2. The output signal supplied from the output terminal Y passes through the one-half frequency divider 57, a pulse forming circuit 58, and an amplifying circuit 59, and supplies a clock pulse for controlling the delay quantity $\tau$ to the CCD 51. The input applied to the selecting terminals S0 through S2, the data input terminal which is applied with the signal which is then selectively supplied as output from the output terminal Y of the data selector 54, the clock pulse frequency $f_c$ of the CCD 51, and the delay quantity $\tau$ of the CCD 51 respectively are related in the manner shown in Table 1.

TABLE 1

| S2 | S1 | S0 | Y | fC | $\tau$ |
|---|---|---|---|---|---|
| 0 | 0 | 0 | D0 | $Nf_H/2.0$ | $2.0 \times 1/f_H$ |
| 0 | 0 | 1 | D1 | $Nf_H/1.25$ | $1.25 \times 1/f_H$ |
| 0 | 1 | 0 | D2 | $Nf_H/0.5$ | $0.5 \times 1/f_H$ |
| 0 | 1 | 1 | D3 | $Nf_H/1.75$ | $1.75 \times 1/f_H$ |
| 1 | 0 | 0 | D4 | $Nf_H/1.0$ | $1.0 \times 1/f_H$ |
| 1 | 0 | 1 | D5 | $Nf_H/2.25$ | $2.25 \times 1/f_H$ |
| 1 | 1 | 0 | D6 | $Nf_H/1.5$ | $1.5 \times 1/f_H$ |
| 1 | 1 | 1 | D7 | $Nf_H/0.75$ | $0.75 \times 1/f_H$ |

The input to the selecting terminals S2, S1, and S0 in the above Table 1 describes the inputs in binary numbers, that is, describes which track is being recorded (a binary number zero indicates that the input is from the track t1, that is, the track t1 is being recorded, a binary number one indicates that the input is from the track t2, - - - , a binary number seven indicates that the input is from the track t8), and when the pulse g having a period of eight tracks supplied from the output terminal 40 is provided as output, the inputs supplied to the selecting terminals S2, S1, and S0 are all zero and indicates that the track t1 is being recorded. Accordingly, the relationship between the track number and the frequency of the discriminating signal, is constant.

Therefore, the delay time is changed over every one track scanning period by the CCD 51, in the order 2.0H, 1.25H, 0.5H, 1.75H, 1.0H, 2.25H, 1.5H, and 0.75H. Accordingly, a carrier chrominance signal having a delay time which is added every scanning period of eight tracks can be obtained, and this carrier chrominance signal thus obtained is supplied to the recording amplifier 16 shown in FIG. 5 through a low-pass filter 60 for eliminating the clock pulse component and an output terminal 61. Hence, the carrier chrominance signals are recorded in a manner so that the frequency modulated signal components (color difference signals) are aligned in the adjacent tracks as shown in FIG. 4, since the carrier chrominance signals in the low frequency range are passed through the above described variable delay circuit 19. Furthermore, discriminating signals having frequencies which differ according to the delay time, are also recorded continuously throughout the entire length of the track.

Figure 11:
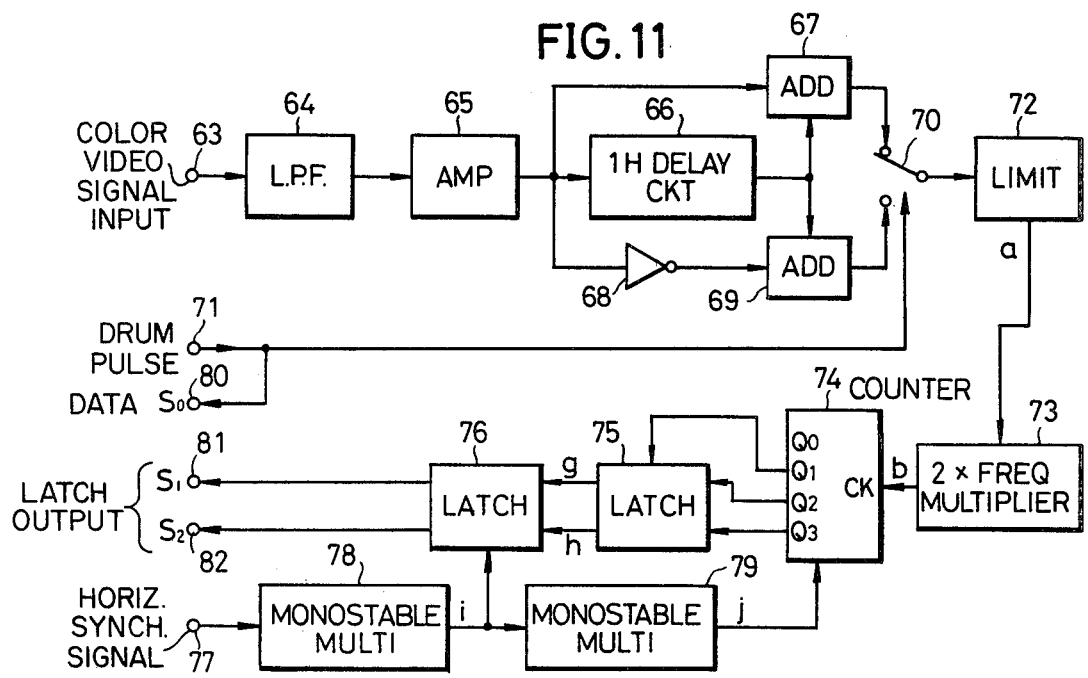
FIG. 11 is a systematic circuit diagram showing one example of the essential part of the reproducing system shown in FIG. 6.

Next, further detailed description will be given on the essential part of the reproducing system, that is, with respect to the discriminating signal detecting circuit 33 and the variable delay circuit 32 shown in FIG. 6. FIG. 11 is a systematic circuit diagram showing an example of the discriminating signal detecting circuit 33. In FIG. 11, the continuous reproduced composite color video signal supplied from the switching circuit 24 shown in FIG. 6, is supplied to an input terminal 63. The discriminating signal having the lowest frequency band, of the above signal supplied to the input terminal 63, is separated and filtered at a low-pass filter 64, and then supplied to an amplifier 65 wherein the signal supplied thereto is amplified to an amplitude required at a one horizontal scanning period (1H) delay circuit 66. The output reproduced discriminating signal of the amplifier 65 is of a low frequency range having small azimuth loss, and includes the discriminating signal reproduced as cross-talk from the adjacent tracks other than the discriminating signal obtained from the track being reproduced. Hence, the signal from the amplifier 65 is supplied to the 1H delay circuit 66 and an adder 67 in order to eliminate the cross-talk, and is also supplied to an adder 69 through an inverter 68 wherein the phase of the signal supplied thereto is reversed. The adder 67 supplies an output which is the sum of a signal delayed by 1H by the 1H delay circuit 66 and a signal which has not been delayed by 1H. On the other hand, the adder 69 supplies an output where the output is the sum of the signal delayed by 1H and the signal which is not delayed by 1H which have respectively undergone phase inversion. That is, the output of the adder 69 is a signal obtained by subtracting the signal which has not been delayed by 1H from the signal delayed by 1H.

When the frequency of the input signal supplied to the 1H delay circuit 66 is $2n \times (f_H/2)$, a signal having an amplitude twice that of the input signal is obtained from the adder 67, however, since the two input signals supplied to the adder 69 mutually cancel each other, no output signal is supplied from the adder 69. In addition, in a case where a signal having a frequency $(2n-1)(f_H/2)$ is supplied to the 1H delay circuit 66, the output of the adder 67 becomes zero, and the amplitude of the output signal of the adder 69 becomes twice that of the input signal. Accordingly, even when a signal having the frequency $2n \times (f_H/2)$ and a signal having the frequency $(2n-1)(f_H/2)$ are mixed, only the signal having the frequency $2n \times (f_H/2)$ is separated and supplied from the adder 67, and only the signal having the frequency $(2n-1)(f_H/2)$ is separated and supplied from the adder 69.

However, the frequency of the discriminating signal is $2n \times (f_H/2)$ or $(2n-1)(f_H/2)$ as described above, and when the discriminating signal frequency is $2n \times (f_H/2)$ in a certain track, the discriminating signal frequency in the tracks adjacent to the certain track is $(2n-1)(f_H/2)$. Moreover, a constant relationship exists wherein the drum pulse is of low level (or high level) in the track having the frequency $2n \times (f_H/2)$ and the drum pulse is of high level (or low level) in the track having the frequency $(2n-1)(f_H/2)$ upon recording of the discriminating signal. Accordingly, a drum pulse supplied from an input terminal 71 is used as a switching signal to changeover the outputs of the adders 67 and 69 by a changeover switch 70, and the changeover switch 70 is connected to the side of the adder 67 when the above drum pulse supplied is of low level, and connected to the side of the adder 69 when the above drum pulse is of high level. Therefore, only the discriminating signal from the track being reproduced, in which the crosstalk from the adjacent tracks have been eliminated, is constantly obtained from the movable contact member of the changeover switch 70.

Figure 12:
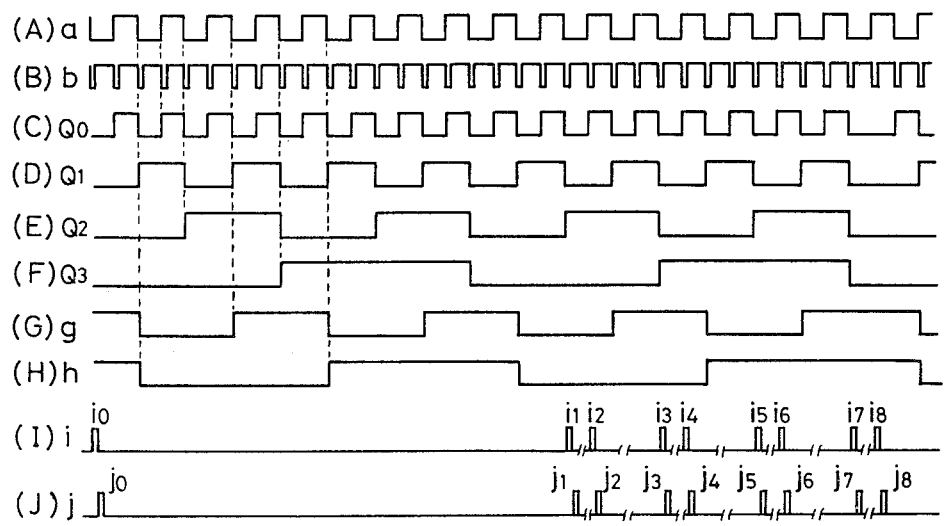
FIGS. 12 (A) through 12 (J) are graphs respectively showing signal waveforms for explaining the operation of the circuit system shown in FIG. 11.

The discriminating signal in which the cross-talk have been eliminated, is converted into a rectangular wave a shown in FIG. 12(A) by a limiter 72. The rectangular wave a in FIG. 12(A) is then converted into a negative polarity pulse b in FIG. 12(B) at a two times multiplier 73 by synchronizing respectively to the rising edge and the falling edge of the above rectangular wave a. This pulse b in FIG. 12(B) is applied to a clock pulse input terminal CK of a four-bit binary counter 74, wherein the pulse is counted. Thus, the outputs supplied from each of the output terminals Q0, Q1, Q2, and Q3 of the counter 74 become as shown in FIGS. 12(C) through 12(F), and the outputs from the output terminals Q2 and Q3 are temporarily stored in a latch 75 at the rising edge of the output supplied from the output terminal Q1. Accordingly, the outputs of the latch 75 become as shown by signals g and h in FIGS. 12(G) and 12(H).

Figure 7:
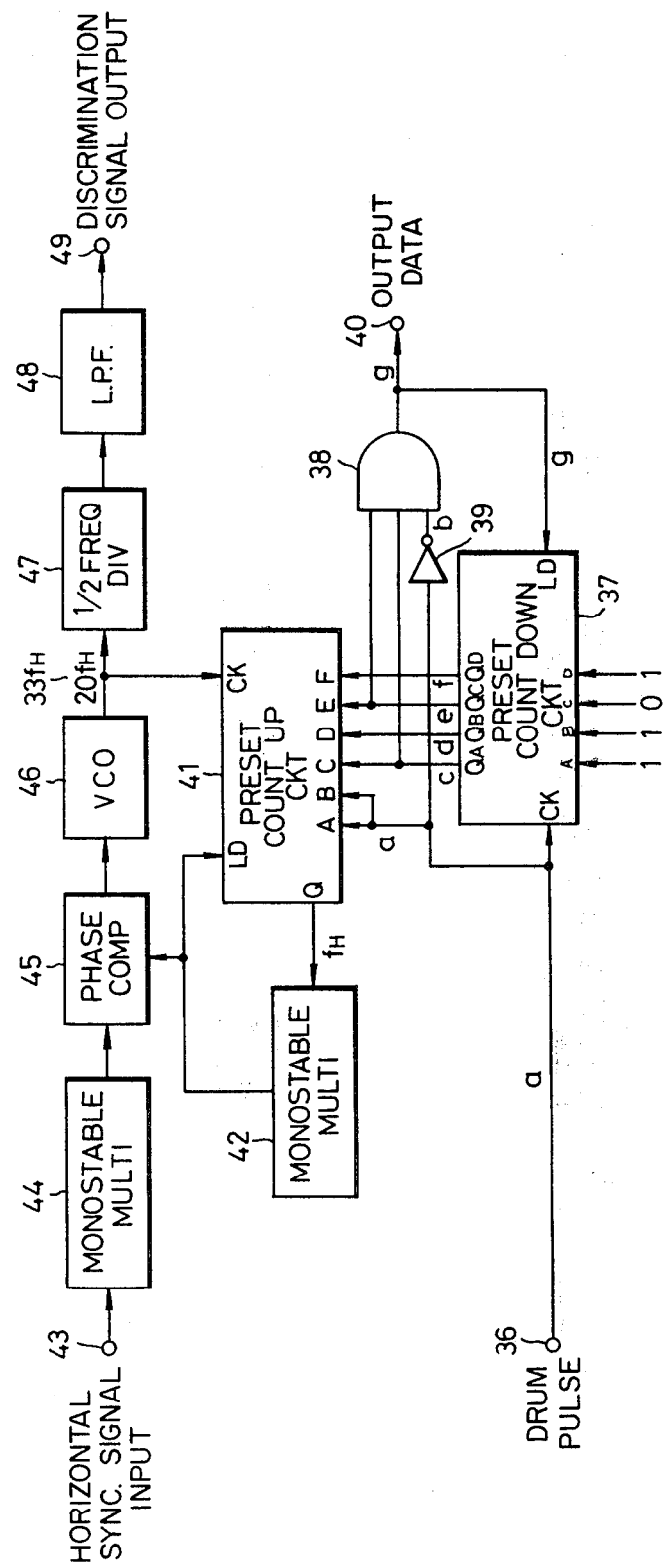
FIG. 7 is a systematic circuit diagram showing an example of the essential part of the recording system shown in FIG. 5.

On the other hand, a horizontal synchronizing signal obtained from a composite synchronizing signal by eliminating equalizing pulses and vertical synchronizing pulses, is applied to an input terminal 77 shown in FIG. 11 by common use of the multivibrator 44 shown in FIG. 7, for example, to trigger a monostable multivibrator 78. This multivibrator 78 generates a positive polarity pulse i0 shown in FIG. 12(I) which has a time width shorter than half the period of the above rectangular wave a shown in FIG. 12(A), at the front edge of the above horizontal synchronizing signal, and applies this pulse i0 to a latch 76 and a monostable multivibrator 79. The multivibrator 79 generates a positive polarity pulse j0 shown in FIG. 12(J) having a time width substantially shorter than half the period of the above rectangular wave a in FIG. 12(A), immediately after the input pulse i0 becomes a low level. Output signals g and h of the latch 75 respectively shown in FIGS. 12(G) and 12(H) are temporarily stored at the latch 76 due to the pulse i0 applied to the latch 76, and information signals indicating whether the output signals g and h of the latch 76 respectively shown in FIGS. 12(G) and 12(H) are of high level or low level, are respectively applied to terminals 81 and 82. The pulse j0 resets the counter 74 immediately after the above information signals are supplied from the latch 76.

The periods of the output pulses of the multivibrators 78 and 79 are constant horizontal scanning periods regardless of the track being reproduced. Moreover, since the signal waveforms shown in FIGS. 12(A) through 12(H) are the same for each track, the waveforms are shown in the same figure, however, it should be noted that the time-axis in FIGS. 12(A) through 12(J) are different for each track being reproduced and scanned. That is, upon reproduction of the track t1, the delay quantity of the carrier chrominance signal is 2.0H, and the discriminating signal frequency is $10.0f_H$ at that point in time. Accordingly, the counter 74 repeats the operation in which the pulse b in FIG. 12(B) is counted in groups of twenty. Hence, the output pulses of the multivibrators 78 and 79 at this point in time become as shown by i0, i1, j0, and j1 in FIGS. 12(I) and 12(J), where the intervals between i0 and i1, and j0 and j1 respectively are 1H. However, upon reproduction of the following track t2, the frequency of the discriminating signal for discriminating the delay quantity of 1.25H is $10.5f_H$. Accordingly, the output pulses of the multivibrators 78 and 79 become as shown by i0, i2, j0, and j2 in FIGS. 12(I) and 12(J), and the intervals between i0 and i2, and j0 and j2 respectively are 1H. Similarly, when the discriminating signal frequencies respectively are $12f_H$, $12.5f_H$, $14f_H$, $14.5f_H$, $16f_H$, and $16.5f_H$, the output pulses of the multivibrators 78 and 79 in one horizontal scanning period respectively become as shown by i3 and j3, i4 and j4, i5 and j5, i6 and j6, i6 and j6, i7 and j7, and i8 and j8 in FIGS. 12(I) and 12(J). Thus, when the discriminating signal frequency is $16.5f_H$, the intervals between i0 and i8, and j0 and j8 respectively are 1H.

In FIG. 11, the outputs of the latch 76 is applied to the terminals 81 and 82, and the signal levels are the same when the discriminating signal frequencies are $10f_H$ and $10.5f_H$. Furthermore, the same state as that of the above is obtained when the discriminating frequency is $12f_H$, $12.5f_H$, $14f_H$, $14.5f_H$, $16f_H$, and $16.5f_H$. However, the state of the drum pulse differs when the frequencies of the inputs are $2n(f_H/2)$ and $(2n-1)(f_H/2)$, and therefore, discrimination can be made between the frequencies $10f_H$ and $10.5f_H$, $12f_H$ and $12.5f_H$, $14f_H$ and $14.5f_H$, and $16f_H$ and $16.5f_H$.

Accordingly, the delay quantity of the variable delay circuit 32 can be variably controlled according to the discriminating signal frequency, by connecting the terminals 80, 81, and 82 to selecting terminals S0, s1, and S2 of a data selector 87 shown in FIG. 13 which will be described hereinafter, and respectively supplying the two outputs of the latch 76 and the drum pulse supplied from the input terminal 71 to the above selecting terminals S0, S1, and S2 of the data selector 87. In this case, the frequency of the discriminating signal is determined with respect to the delay quantity of the carrier chrominance signal which is converted into a low frequency range upon recording. Thus, upon reproduction, the data selector 87 selects the output of a frequency divider 86 according to the state of the selecting terminals S0, S1, and S2 of the data selector 87, so that the sum of the delay quantities of the carrier chrominance signal upon recording and reproduction is constant (the sum of the delay quantities is 3H in the present embodiment of the invention), that is, so that the relative difference between the delay quantities becomes zero in the reproducing system.

Because the discriminating signal is multiplexed and recorded throughout the entire length of the track, the discriminating signal can be detected even upon variable-speed reproduction, and a delay quantity which sets the time relationship of the carrier chrominance signal to a normal state, can thus be obtained.

Next, description will be given with respect to the operation of the variable delay circuit 32 in the reproducing system shown in FIG. 6. FIG. 13 is a systematic block diagram showing one example of the variable delay circuit 32. In FIG. 13, the reproduced carrier chrominance signal in the low frequency range which has been separated and filtered by the band-pass filter shown in FIG. 6, is applied to a CCD 84 through an input terminal 83, and is added with a predetermined delay quantity at the above CCD 84. The circuit construction of the variable delay circuit 32 is similar to that of the variable delay circuit 19, and comprises the CCD 84, a clock pulse generator 85, the frequency divider 86, the data selector 87, a one-half frequency divider 88, a pulse forming circuit 89, an amplifying circuit 90, and a low-pass filter 91 for eliminating the clock pulse frequency. Frequency dividers 86a through 86i which construct the data selector 87 and the frequency divider 86, can be used in common with the corresponding circuit parts in the recording system shown in FIG. 8, excluding the frequency divider 86i. However, since the delay quantity of 0.5H is not used upon reproduction, the output of the frequency divider 56a which was used upon recording is not connected to the data selector 87. The outputs of the other seven frequency dividers 86b (56b), 86c (56c), 86d (56d), 86e (56e), 86f (56f), 86g (56g), and 86h (56h) are respectively connected to the two data selectors 87 and 54. Furthermore, the input terminal of the one-half frequency divider 88 is connected to the output terminal Y of the data selector 54 upon recording, and connected to the output terminal of the data selector 87 upon reproduction by an electronic switch (not shown). Moreover, the frequency divider 86i is used to obtain the delay quantity of 2.5H, and therefore cannot be used in common with the recording system.

Signals obtained by frequency-dividing the signal frequency $8Nf_H$ of the output signal of the clock pulse generator 85 at the frequency divider 86, are applied to the input terminals D0 through D7 of the data selector 87, and signals having the frequencies $2Nf_H$, $(8/7)Nf_H$, $(4/5)Nf_H$, $(8/5)Nf_H$, $Nf_H$, $(8/3)Nf_H$, $(4/3)Nf_H$, and $(8/9)Nf_H$ are respectively applied to the data input terminals D0, D1, D2, D3, D4, D5, D6, and D7. In addition, the detected outputs obtained by detecting the discriminating signals, are applied to he selecting terminals S0, S1, and S2 of the data selector 87 from the output terminals 80, 81 and 82 of the discriminating signal detecting circuit 33 shown in FIG. 11. Accordingly, the relationship between the inputs applied to the selecting terminals S0, S1, and S2 of the data selector 87, the data input terminal which has originally supplied the signal which is selectively supplied as output from the output terminal Y, the clock pulse frequency $f_c$ of the CCD 84, and the delay quantity $\tau$ of the CCD 84, become as shown in the following Table 2.

TABLE 2

| S2 | S1 | S0 | Y | $f_c$ | $\tau$ |
|----|----|----|----|-------|--------|
| 0 | 0 | 0 | D0 | $Nf_H/1.0$ | $1.0 \times 1/f_H$ |
| 0 | 0 | 1 | D1 | $Nf_H/1.75$ | $1.75 \times 1/f_H$ |
| 0 | 1 | 0 | D2 | $Nf_H/2.5$ | $2.5 \times 1/f_H$ |
| 0 | 1 | 1 | D3 | $Nf_H/1.25$ | $1.25 \times 1/f_H$ |
| 1 | 0 | 0 | D4 | $Nf_H/2.0$ | $2.0 \times 1/f_H$ |
| 1 | 0 | 1 | D5 | $Nf_H/0.75$ | $0.75 \times 1/f_H$ |
| 1 | 1 | 0 | D6 | $Nf_H/1.5$ | $1.5 \times 1/f_H$ |
| 1 | 1 | 1 | D7 | $Nf_H/2.25$ | $2.25 \times 1/f_H$ |

The input to the selecting terminals S2, S1, and S0 of the data selector 87 in the above Table 2 describes the inputs in binary numbers, that is, describes which track is being reproduced (a binary number zero indicates that the input is from the track t1, that is, the track t1 is being reproduced, a binary number one indicates that the input is from the track t2, - - - , a binary number seven indicates that the input is from the track t8). Accordingly, the carrier chrominance signal having a delay time of 2.0H which is reproduced from the track t1 of a tape pattern shown in FIG. 4, is added with a delay time of 1.0H by the CCD 84 as shown in Table 2, and is supplied to an output terminal 92 through the low-pass filter 91. On the other hand, the carrier chrominance signal having a delay time of 1.25H which is reproduced from the track t2, is added with a delay time of 1.75H at the CCD 84, and is supplied to the output terminal 92 through the low-pass filter 91. Similarly, as clearly seen from Table 2, the carrier chrominance signals respectively having the delay times 0.5H, 1.75H, 1.0H, 2.25H, 1.5H and 0.75H which are successively reproduced from the tracks t3, t4, t5, t6, t7, and t8 shown in FIG. 4, are respectively and successively added with delay times of 2.5H, 1.25H, 2.0H, 0.75H, 1.5H, and 2.25H as shown in Table 2.

The carrier chrominance signals which are added with predetermined delay times upon recording, and added with predetermined delay times upon reproduction, that is, the reproduced carrier chrominance signals in the low frequency range which are reproduced from all the tracks in the tape pattern shown in FIG. 4, are all delayed by a delay time of 3H (2H in the case of the pattern shown in FIG. 3) throughout recording and reproduction, and are respectively returned to the original frequency bands by being supplied to the four times multiplier 30.

By performing the above described signal processing, the carrier chrominance signals which are added with predetermined delay times and arranged in an H-alignment upon recording, are reproduced where the relative difference in the delay times are set to zero. Therefore, a high quality color picture which is hardly effected by cross-talk from the adjacent tracks can accordingly be obtained. However, the reproduced carrier chrominance signals lag by 3H with respect to the reproduced luminance signals in the case where the tape pattern shown in FIG. 4 is used, and the reproduced carrier chrominance signals lag by 2H with respect to the reproduced luminance signals in the case where the tape pattern shown in FIG. 3 is used. This time delay in the reproduced carrier chrominance signals with respect to the reproduced luminance signals may in some cases introduce irregular color reproduction in certain types of television receivers in which no color is reproduced and accurate color reproduction is not obtained. The above irregular color reproduction is mainly due to the fact that, a discriminating signal for discriminating whether the frequency modulated signal component of the carrier chrominance signal is the color difference signal R-Y or B-Y, is multiplexed in a SECAM system color video signal, however, a circuit for separating and obtaining the above discriminating signal performs an erroneous operation due to the above time delay. In this case, a delay circuit 22 shown by one-dot chain line in FIG. 5, is provided at the luminance signal transmitting passage between the low-pass filter 11 and the AGC circuit 13 in the recording system. On the other hand, a delay circuit 34 shown by one-dot chain line in FIG. 6, is provided at the demodulated luminance signal transmitting passage between the demodulating circuit 26 and the composite circuit 27. Accordingly, by providing the above delay circuits 22 and 34, the relative time difference between the reproduced luminance signal and the reproduced carrier chrominance signal can be set to a small value, or zero.

When the delay times of the above delay circuits 22 and 34 are respectively set to 1H, both delay circuits can be used in common. Moreover, only one of the delay circuits 22 and 34 can be provided to add a delay time of 2H or 3H. The variable delay circuits 19 and 32 are constructed to delay the carrier chrominance signal in the low frequency range, by considering the transmitting frequency bands of the CCDs 51 and 84, the clock pulse frequency, and the like, however, it is theoretically possible to delay a carrier chrominance signal in a predetermined high frequency band, at a stage before the one-fourth frequency divider 17 or at a stage after the four times multiplier 30.

In the above embodiment of the present invention, descriptions were given wherein the color video signal being recorded and reproduced was a SECAM system color video signal, however, the present invention can also be applied to a PAL system color video signal. Moreover, other charge transferring elements such as a bucket brigade device (BBD) can be used instead of the CCD which was used as a variable delay element. Furthermore, a random access memory (RAM) can also be used instead of the above CCD, by varying the clock pulse frequencies of the clock pulses used for write-in and read-out (the clock pulse frequencies must always have the same relationship). The delay times are not limited to the eight kinds described above, and can be of any number of kinds as long as the carrier chrominance signals which are converted into a predetermined frequency band and recorded, are arranged in an H-alignment upon recording. In addition, the shift in the horizontal synchronizing intervals is of course not limited to the 0.75H used above.

The recording medium can be a magnetic disc, video disc, a card, and the like, and thus, other transducers such as a light beam transducer can be used for the recording means according to the recording medium being used.

Further, this invention is not limited to these embodiments but various variations and modifications may be made without departing from the scope of the invention.

What is claimed is:

1. A color video signal recording and/or reproducing system in which a luminance signal (including a synchronizing signal) and a carrier chrominance signal are respectively separated from a color video signal and are respectively converted into predetermined signal forms to be mixed, multiplexed, and successively recorded onto mutually adjacent parallel tracks on a recording medium, and said luminance signal and said carrier chrominance signal respectively having said predetermined signal forms which are obtained from a signal which is reproduced from said recording medium, are respectively returned into the original signal forms and said luminance and chrominance signals then being mixed and multiplexed in order to obtain a reproduced color video signal, recorded positions of horizontal synchronizing signals of the luminance signal contained in the mixed and multiplexed signal not being aligned in the mutually adjacent tracks on said recording medium, said recording system comprising:

first frequency converting means for frequency-converting said separated carrier chrominance signal into a low frequency range;

first delaying means coupled to said first frequency converting means, for adding a pre-established delay time to said carrier chrominance signal for every recording unit of each track, so that recording positions of each interval of said frequency-converted carrier chrominance signal corresponding to a horizontal synchronizing interval between the horizontal synchronizing signals of the luminance signal are aligned in the mutually adjacent tracks;

frequency modulator means for frequency-modulating said separated luminance signal;

first mixing means for respectively multiplexing the output luminance signal of said frequency modulator means and the carrier chrominance signal obtained from said first delaying means; and recording means for recording the multiplexed signal obtained from said first mixing means onto said recording medium.

2. A color video signal recording and/or reproducing system as claim in claim 1 in which said color video signal is either a SECAM system or a PAL system video signal, and said first delaying means performs the delay so that the intervals of the carrier chrominance singal, corresponding to the horizontal synchronizing intervals between the horizontal synchronizing signals of the luminance signal, having the same frequency modulated signal component are aligned and recorded on the adjacent tracks.

3. A color video signal recording and/or reproducing system as claimed in claim 1 in which said recording means forms video tracks on a magnetic tape without substantially forming guard bands, and said recording means and said reproducing means respectively record and reproduce adjacent video tracks by use of magnetic heads having mutually different azimuth angles.

4. A color video signal recording and/or reproducing system as claimed in claim 1 in which said reproducing system comprises:

reproducing means for reproducing said multiplexed signal from said recording medium;

demodulating means for separating the frequency modulated luminance signal from said multiplexed signal obtained by said reproducing means and demodulating said separated frequency modulated luminance signal;

second delaying means for separating the carrier chrominance signal which is frequency-converted into a low frequency range from said multiplexed signal obtained by said reproducing means and delaying said separated frequency converted carrier chrominance signal so that the sum of the delay quantities upon recording and reproduction becomes a constant value regardless of the track being reproduced;

second frequency converting means for frequency-converting the delayed carrier chrominance signal obtained by said second delaying means into the original frequency range; and second mixing means for respectively multiplexing the output luminance signal of said demodulating means and the output carrier chrominance signal of said second frequency converting means to obtain a reproduced color video signal.

5. A color video signal recording and/or reproducing system as claimed in claim 4 which further comprises means for delaying the separated luminance signal by a delay which is approximately equal to said constant delay time of said reproduced carrier chrominance signal, provided at a luminance signal transmitting passage in said recording and/or reproducing systems.

6. A color video signal recording and/or reproducing system as claimed in claim 4 in which said first delay means and/or said second delay means comprise a charge transferring element supplied with said carrier chrominance signal which is frequency-converted into the low frequency range, a clock pulse generating circuit means for generating a train of clock pulses, and a clock pulse frequency varying circuit coupled to said clock pulse generating circuit means, for varying the output clock pulse of said clock pulse generating circuit means every recording and/or reproducing unit of the track on said recording medium, and means for applying a delay time to said charge transmitting element, said delay time being inversely proportional to the input signal frequency of said charge transmitting element.

* * * * *